Jan. 12, 1954   B. HILLBERG   2,665,578
WIRE CLIP FOR HOLDING IN PLACE FURRING SUPPORTING RODS
Filed Feb. 5, 1951
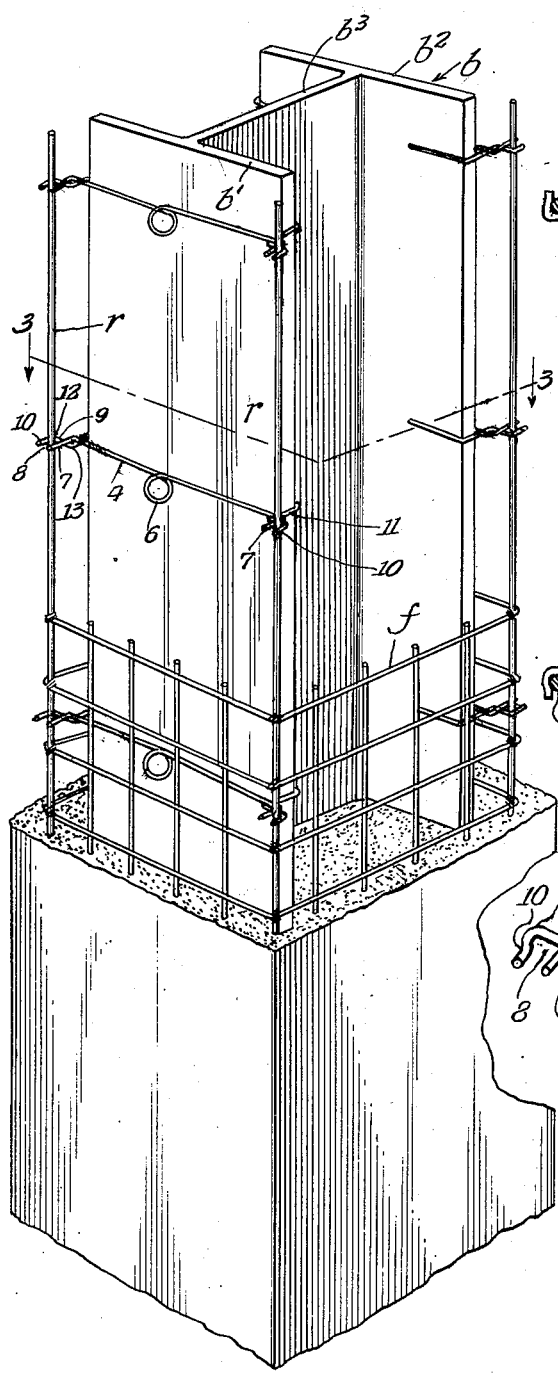
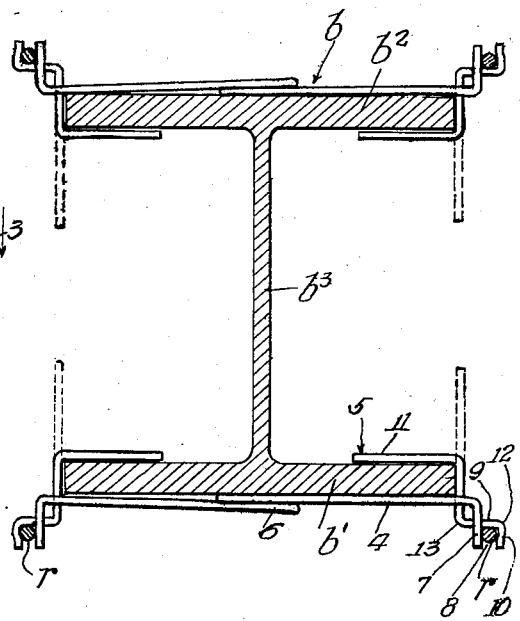
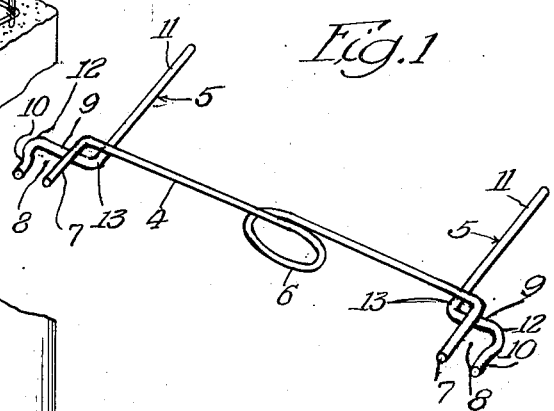
Inventor
Bror Hillberg Patented Jan. 12, 1954

2,665,578

UNITED STATES PATENT OFFICE 2,665,578

WIRE CLIP FOR HOLDING IN PLACE FURRING SUPPORTING RODS

Bror Hillberg, Chicago, Ill., assignor to Superior Concrete Accessories, Inc., Chicago, Ill., a corporation of Illinois Application February 5, 1951, Serial No. 209,419

2 Claims. (Cl. 72—109)

1

The present invention relates generally to clips for use in connection with reenforced concrete construction. More particularly the invention relates to that type of clip which is adapted to be applied to one of the flanges of an I-beam or like structural element, serves with spaced apart similar clips to hold outwards of the outer corners of the one I-beam flange a pair of parallel rods for supporting and retaining wire variety furring in connection with pouring of concrete around the beam, rods and furring, and comprises an elongated member which is designed and adapted to extend transversely across the outer surface of the one I-beam flange and embodies at its ends rod-receiving sockets and, in addition, bendable attaching or anchoring parts for encompassing and gripping the side edges and inner surfaces of the one flange of the I-beam and thus securing the clip in place.

One object of the invention is to provide a clip of this type which is an improvement upon, and has certain advantages over, previously designed clips for the same purpose and is characterized by simplicity of design, high efficiency and cheapness of construction.

Another object of the invention is to provide a clip of the type under consideration in which the elongated member which is designed and adapted to extend transversely across the outer surface of the one flange of the I-beam is formed of wire and embodies at its central portion a substantially circular open loop which urges the bendable attaching parts towards one another into firm gripping relation with the adjacent portions of the one flange of the I-beam, permits said attaching parts to be spread or shifted apart in the event that the one I-beam flange is slightly oversized in width, and serves to prevent tilting or turning of the clip in connection with and after application thereof to the beam.

Another object of the invention is to provide a clip of the last mentioned character in which the rod-receiving sockets at the ends of the transversely extending loop are formed by wire parts and have restricted entrances in order that the rods may, by lateral shift, be inserted into them with a snap action and are firmly and securely held in place after insertion into the sockets.

Another object of the invention is to provide a clip of the aforementioned type and character in which the ends of the elongated transversely extending wire formed member are bent outwards at right angles to form the inner side pieces for the rod-receiving sockets, and the intermediate pieces and outer side pieces for the sockets are

2 formed by the intermediate and outer end portions of Z-shaped wire formed end members.

A further object of the invention is to provide a clip of the last mentioned character in which the inner end portions of the wire end members form the bendable parts for encompassing and gripping the side edges and inner surfaces of the one flange of the I-beam and thus securing the clip in place.

A still further object of the invention is to provide a clip which is generally of new and improved construction, effectively and efficiently fulfills its intended purpose and may be mounted in place with facility.

Other objects of the invention and the various advantages and characteristics of the present clip will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals and letters of reference denote corresponding parts throughout the several views:

Figure 1 is a perspective view of a clip embodying the invention;

Figure 2 is a fragmentary perspective showing the clip together with similar clips applied to a column-forming I-beam and serving to hold in place the rods for supporting and retaining wire variety furring; and Figure 3 is a horizontal section on the line 3—3 of Figure 2.

The clip which is shown in the drawing constitutes the preferred form or embodiment of the invention. It is illustrated in connection with an I-beam $b$ and serves with spaced apart similar clips to hold outwards of the outer corners of one of the I-beam flanges a pair of parallel rods $r$ for supporting and retaining wire furring $f$ in connection with pouring of concrete around the beam, rods and furring. The I-beam $b$ is shown in the drawing as extending vertically for column forming purposes. It is of conventional or standard construction and comprises a pair of parallel spaced apart flanges $b^1$ and $b^2$ and an integral web $b^3$ between the central portions of the two webs. The rods $r$ are shown in the drawing as being spaced outwards from the outer corners of the flange $b^1$ of the I-beam. They serve to space the furring $f$ from the I-beam and are preferably in the form of #0 steel wire. The furring

*f* may be of any well known type and is secured to the rods *r* in any suitable manner.

The clip is of unitary character and consists of but three parts, namely, an elongated main member 4, and a pair of Z-shaped end members 5. These three members are preferably formed of #8 wire in order that they are sufficiently stiff or rigid for their intended purpose while at the same time they are capable of being bent when sufficient force is applied thereto. The wire main member 4 is adapted to extend transversely across the outer surface of the flange $b^1$ of the I-beam as shown in Figures 2 and 3. It is longer than the flange $b^1$ is wide and has the central portion thereof bent to form a substantially circular open loop 6. The latter is adapted to fit flatly against the outer surface of the flange $b^1$ of the I-beam and has a twofold purpose in that it permits the end portions of the wire main part 4 to be spread or shifted apart to a limited extent and prevents tilting of the clip when the latter is mounted on the flange $b^1$ as hereinafter described. The ends of the wire main member 4 are designated by the reference numeral 7. They are bent outwards at right angles and form the inner side pieces of a pair of restricted entrance sockets 8 for the rods *r*. The distance between the outwardly bent ends 7 is greater than the width of the flange $b^1$ of the I-beam *b* in order that the sockets 8 are laterally offset with respect to the side edges of the flange $b^1$. The Z-shaped wire end members 5 of the clip are located adjacent the outwardly bent ends 7 of the wire main member 4 and consist of intermediate parts 9, outer end parts 10 and inner end parts 11. The intermediate parts 9 of the end members 5 are positioned in substantially parallel and forwardly spaced relation to the portions of the main wire member 4 which extend between the loop 6 and the bent ends 7 and which engage the outer surface of the flange $b^1$. The central portions of the intermediate parts 9 of the end members 5 extend across, and are welded to, the inner portions of the outwardly bent ends 7. The outer end portions of the intermediate parts 9 constitute the intermediate pieces for the rod-receiving sockets 8. The outer end parts 10 of the end members 5 are connected to the outer extremities of the intermediate parts 9 by right angle bends 12 in order that they extend outwards in substantially parallel relation with the outwardly bent ends 7 of the wire main member 4. They define the outer side pieces for the rod-receiving sockets 8 and have the outer extremities thereof bent inwards and then outwards in order that the entrances of the sockets are of restricted character and hence the rods *r*, when shifted laterally into the sockets, enter the sockets with a snap action and are firmly and securely held in place in the sockets. As is apparent in the drawing, the sockets are of such size that they snugly receive the rods *r*. The right angle bends 12 permit the outer end parts 10 of the end members 5 to flex or spring outwards when the rods are shifted laterally through the aforementioned restricted entrances into the sockets. The inner end parts 11 of the end members 5 are connected to the inner extremities of the intermediate parts 9 by right angle bends 13. The inner extremities of the inner end parts 11 extend across, and are welded to, the portions of the wire main member 4 that are directly inwards of the outwardly bent ends 7. The portions of the inner end parts 11 that are directly inwards of the inner welded extremities are adapted when the clip is in place as shown in Figures 2 and 3 to extend across and to abut against the side edges of the flange $b^1$ of the I-beam *b*, and the outer end portions of said inner end parts 11 are adapted to be bent inwards at right angles into lapped and gripping relation with the inner surfaces of the flange $b^1$ in order to hold or maintain the clip in its operative position. The distance between the portions of the inner end parts 11 that are adapted to extend across and abut against the side edges of the flange $b^1$ is preferably slightly less than the width of the flange. Because of this it is necessary in connection with application of the clip to pull said portions outwards before they may be slid into place. After said portions have been slid into place and then released the looped 6 clamps them firmly against the side edges of the flange $b^1$ with spring pressure. The loop 6, because of its size, permits the clip to be applied to any I-beam flange which is slightly over sized in width.

When it is desired to use the clip the inner end parts 11 of the end members 5 are spread or pulled apart and the clip is shifted towards the flange $b^1$ of the I-beam *b* in order to bring the inner end portions of the inner end parts 11 into straddled relation with the side edges of the flange. Thereafter the outer end portions of the end members 5 are bent inwards at right angles into lapped and gripping relation with the inner surfaces of the flange $b^1$. When the clip is in place the restricted entrance sockets 8 face outwards and are outwardly and laterally offset with respect to the outer corners of the flange $b^1$. It is contemplated that after mounting of the clip in place similar clips will be applied to the flange $b^1$, as shown in Figure 2. After the clips are properly mounted in spaced apart relation on the flange $b^1$ the rods *r* are shifted laterally into the restricted entrance sockets 8. After the rods are inserted into the sockets the furring *f* is secured to the rods and concrete is then poured around the beam, clips, rods and furring in order to form a reenforced column. It is also contemplated that the flange $b^2$ of the I-beam *b* will also be provided with clips and rods like those heretofore mentioned (see Figures 2 and 3).

The herein described clip effectively and afficiently fulfills its intended purpose and may be applied with facility. Due to its particular construction and design the clip is capable of being produced at an extremely low cost. The loop 6 of the clip has a twofold purpose as heretofore mentioned. It is contemplated that if the clip is applied to one of the flanges of a vertically extending I-beam the loop will project or extend downwards as shown in Figure 2.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a unitary clip adapted to be applied to one of the flanges of an I-beam or like structural element and further adapted with spaced apart similar clips to hold outwards of, and in parallel relation with, the outer corners of the one flange of the I-beam a pair of spaced apart furring supporting rods, said clip comprising an elongated main member formed of wire, adapted to fit against, and extend transversely across, the outer surface of said one flange and having the ends thereof projecting beyond the side edges of said one flange, said ends of the main member being bent outwards at right angles and forming the inner side pieces for a pair of outwardly facing rod-receiving sockets, said clip also comprising a pair of separately formed Z-shaped end members formed of wire, located adjacent the ends of the main member and consisting of intermediate parts, outwardly extending end parts and inwardly extending end parts, the intermediate parts of the end members extending in substantially parallel relation with the portions of the main member that are immediately inwards of the outwardly bent ends of said main member, said intermediate parts of the end members having their central portions extending across, and welded to, the inner portions of the outwardly bent ends of the main member, and also having their outer end portions arranged to form the intermediate pieces for the rod-receiving sockets, the outwardly extending end parts of the end members extending outwards from, and being connected by right angle bends to, the outer extremities of said intermediate parts and forming the outer side pieces for said sockets, the inwardly extending end parts of the end members being connected by right angle bends to the inner extremities of the intermediate parts of the end members, said inwardly extending end parts having the inner extremities thereof extending across, and welded to, the portions of the main member that are directly inwards of said outwardly bent ends, and also having the remaining portions thereof free and adapted to fit against, and be bent around, the side edges and inner surfaces of said one flange in order to hold the clip in place.

2. As a new article of manufacture, a unitary clip adapted to be applied to one of the flanges of an I-beam or like structural element and further adapted with spaced apart similar clips to hold outwards of, and in parallel relation with, the outer corners of the one flange of the I-beam a pair of spaced apart furring supporting rods, said clips comprising an elongated main member formed of wire, adapted to fit against, and extend transversely across, the outer surface of said one flange and having the ends thereof projecting beyond the side edges of said one flange, said ends of the main member being bent outwards at right angles and forming the inner side pieces for a pair of outwardly facing rod-receiving sockets, said clip also comprising a pair of separately formed Z-shaped end members formed of wire, located adjacent the ends of the main member and consisting of intermediate parts, outwardly extending end parts and inwardly extending end parts, the intermediate parts of the end members extending in substantially parallel relation with the portions of the main member that are immediately inwards of the outwardly bent ends of said main member, said intermediate parts of the end members having their central portions extending across, and fixedly connected to, the inner portions of the outwardly bent ends of the main member, and also having their outer end portions arranged to form the intermediate pieces for the rod-receiving sockets, the outwardly extending end parts of the end members extending outwards from, and being connected by right angle bends to, the outer extremities of said intermediate parts and forming the outer side pieces for said sockets, the inwardly extending end parts of the end members being connected by right angle bends to the inner extremities of the intermediate parts of said end members, said inwardly extending end parts having the inner extremities thereof extending across, and fixedly secured to, the portions of the main member that are directly inwards of said outwardly bent ends, and also having the remaining portions thereof free, spaced normally apart a distance less than the width of said one flange and adapted to fit against, and be bent around, the side edges and inner surfaces of said one flange in order to hold the clip in place, said main member having the central portion thereof bent to form an open comparatively large downwardly extending spring type loop which extends at right angles to the rod-receiving sockets and permits the inwardly extending end parts of the end members, before bending thereof, to be pulled away from one another, said loop serving after bending of said inwardly extending end parts of the end members to urge the latter towards one another with spring pressure and being adapted after mounting of the clip in place to fit flatly against the outer surface of said one flange of the I-beam and to coact therewith to prevent tilting or turning of the clip in one direction.

BROR HILLBERG.

References Cited in the file of this patent

UNITED STATES PATENTS

| Number | Name | Date |
|---|---|---|
| 1,028,559 | Escher | June 4, 1912 |
| 1,143,100 | Brewington | June 15, 1915 |
| 1,497,936 | Oliver | June 17, 1924 |
| 1,616,977 | Koiun | Feb. 8, 1927 |
| 1,896,279 | Bitney | Feb. 7, 1933 |
| 2,080,878 | Reed | May 18, 1937 |
| 2,170,635 | Emigholz | Aug. 22, 1939 |

FOREIGN PATENTS

| Number | Country | Date |
|---|---|---|
| 317,116 | Great Britain | of 1929 |
| 513,585 | Great Britain | of 1939 |